United States Patent
Alfano et al.

[11] Patent Number: 6,037,732
[45] Date of Patent: Mar. 14, 2000

[54] INTELLIGENT POWER MANAGEMENT FOR A VARIABLE SPEED FAN

[75] Inventors: Donald E. Alfano, Round Rock; Joseph J. Judkins, III, Cedar Park, both of Tex.; Quoi V. Huynh, San Jose; Sang T. Ngo, Cupertino, both of Calif.

[73] Assignee: TelCom Semiconductor, Inc., Mountain View, Calif.

[21] Appl. No.: 09/063,072

[22] Filed: Apr. 21, 1998

Related U.S. Application Data

[63] Continuation-in-part of application No. 08/749,864, Nov. 14, 1996.

[51] Int. Cl.[7] .................................................. G05B 5/00
[52] U.S. Cl. ........................ 318/471; 318/434; 318/799; 318/432; 318/481; 318/254; 388/831; 388/903
[58] Field of Search ..................................... 318/471, 434, 318/799, 432, 481, 254; 388/903, 831

[56] References Cited

U.S. PATENT DOCUMENTS

| | | | |
|---|---|---|---|
| 4,659,290 | 4/1987 | Kundert | 417/32 |
| 4,722,669 | 2/1988 | Kundert | 417/32 |
| 4,856,078 | 8/1989 | Konopka | 388/831 |
| 5,028,861 | 7/1991 | Pace et al. | 323/222 |
| 5,099,181 | 3/1992 | Canon | 318/254 |
| 5,197,858 | 3/1993 | Cheng | 417/14 |
| 5,257,508 | 11/1993 | Powell et al. | 318/434 |
| 5,363,024 | 11/1994 | Hiratsuka et al. | 318/254 |
| 5,364,026 | 11/1994 | Kundert | 236/49.3 |
| 5,448,143 | 9/1995 | Pecone | 318/434 |
| 5,457,766 | 10/1995 | Ko | 388/831 |
| 5,563,480 | 10/1996 | Okada | 318/254 |
| 5,727,928 | 3/1998 | Brown | 318/434 |
| 5,806,440 | 9/1998 | Rowlette et al. | 318/432 |

OTHER PUBLICATIONS

Randy G. Flatness, "Triple Output 3.3V, 5V, and 12V High Efficiency Notebook Power Supply—Design Note RF," Linear Technology Corporation Design Notes, (date unavailable) (2 pages).

Paul D. Gracie, "Intermittent converter saves power," Design Ideas, EDN, Charles H. Small, ed., Sep. 1, 1989, p. 151.

(List continued on next page.)

*Primary Examiner*—Karen Masih
*Attorney, Agent, or Firm*—Thomas E. Schatzel; Law Offices of Thomas E. Schatzel, A Prof. Corp.

[57] ABSTRACT

A method for controlling the operation of a brushless DC fan for cooling heat generating components of a system is provided. The method includes providing a system temperature signal indicative of a system temperature and providing an intelligent shutdown enable signal. The system temperature signal is compared with a shutdown temperature signal if the intelligent shutdown enable signal has a first value. The shutdown temperature signal is representative of a shutdown temperature value. The fan is operated at a generally temperature proportional speed after comparing the system temperature signal with the shutdown temperature signal if the system temperature as indicated by the system temperature signal is greater than the shutdown temperature value as indicated by the shutdown temperature signal. A shutdown mode is entered by the fan after comparing the system temperature signal with the shutdown temperature signal if the system temperature as indicated by the system temperature signal is less than the shutdown temperature value as indicated by the shutdown temperature signal. The system temperature signal is compared with the shutdown temperature signal after entering the shutdown mode by the fan. Operation of the fan is initiated if the system temperature as indicated by the system temperature signal is greater than the shutdown temperature value as indicated by the shutdown temperature signal and the fan is in the shutdown mode.

30 Claims, 5 Drawing Sheets

OTHER PUBLICATIONS

"NLX Power Supply Recommendations, Version 1.1," Intel Corporation, May 1997, pp. 1–17.

"NLX Electrical Design Suggestions, Version 1.2," Intel Corporation, Jan. 1998, pp. 1–42.

"Fan Speed Controller With Auto–Shutdown," TelCom Semiconductor, Inc. datasheet, Apr. 7, 1998, pp. 1–15 (downloaded from http://www.telcom–semi.com/datashts/TC646.pdf, Apr. 20, 1998).

"NLX Thermal Design Suggestions, Version 1.0," Intel Corporation, May 1997 (7 pages).

"ML4873—Battery Power Control IC," Micro Linear Corporation Data Sheet, San Jose, California, Jan. 7, 1997, pp. 1–12.

INTELLIGENT POWER MANAGEMENT FOR A VARIABLE SPEED FAN

CROSS-REFERENCE TO RELATED APPLICATIONS

The present application is a continuation-in-part of U.S. patent application, Ser. No. 08/749,864, attorney reference number M-4131 U.S., filed on Nov. 14, 1996, entitled "Monolithic Fan Controller", naming Quoi V. Huynh, Sang T. Ngo, Joseph James Judkins III and Donald E. Alfano as inventors, and which is incorporated herein by reference.

BACKGROUND

1. Field of the Invention

The present invention relates to fan control, and, more particularly, to power management techniques for a variable speed fan.

2. Description of the Related Art

Fans are standard components in many commercial computers, workstations, notebook and desktop personal computer systems, and in many other electronic and mechanical systems. Fans remove heat generated due to operation of integrated circuits and other components in such systems. An example of a common type of fan is the brushless DC fan. Brushless fans do not include a conductor serving to maintain an electrical connection between stationary and moving parts of the fan.

The use of fans often presents certain disadvantages in various systems. For example, fans generate objectionable acoustic noise, especially when run at full speed. Also, fins often have a service life which is less than the service life of the equipment they protect. Additionally, fans require large amounts of operating current which can present a problem for low power, "green" personal computer systems.

Many systems vary the speed of the fan directly with measured temperature. For example, fan speed is increased with increases in measured temperature. Such a thermal fan speed control may be built into the fan itself or provided by supplemental circuitry such as a processor within the system. To further minimize the disadvantages of fans, a fan may operate only when required and be turned off (herein, shutdown) during all other times. However, if excessive heat is generated within the system when the fan is in shutdown, system safety is compromised. Consequently, the system should constantly monitor temperature and intervene (e.g., terminate shutdown) when cooling is required. Such capability requires additional software and/or hardware, thereby increasing system complexity. Thus, there is a need for a simple, effective and inexpensive method and/or apparatus for minimizing the above discussed disadvantages of fan use.

SUMMARY

A power control technique for a variable speed, brushless DC fan includes a continuous operation mode and an intelligent shutdown mode. An intelligent shutdown control signal determines which mode is operational. The continuous operation mode includes providing a controlled, variable amount of operating power to the fan when measured temperature is above a prescribed limit, and providing a substantially constant amount of operating power to the fan when measured temperature is below a prescribed limit. The intelligent shutdown mode includes providing a controlled, variable amount of operating power to the fan when measured temperature is above a prescribed limit, and shutting down the fan when measured temperature is below a prescribed limit. Such a power control technique minimizes the disadvantages of fan operation without compromising system safety and without intervention by the system. Energy is conserved by reducing supply current to the fan controller. A simple, compact fan controller provides the above advantages.

In one embodiment, a method for controlling the operation of a brushless DC fan for cooling heat generating components of a system is provided. The method includes providing a system temperature signal indicative of a system temperature and providing an intelligent shutdown enable signal. The system temperature signal is compared with a shutdown temperature signal if the intelligent shutdown enable signal has a first value. The shutdown temperature signal is representative of a shutdown temperature value. The fan is operated at a generally temperature proportional speed after comparing the system temperature signal with the shutdown temperature signal if the system temperature as indicated by the system temperature signal is greater than the shutdown temperature value as indicated by the shutdown temperature signal. A shutdown mode is entered by the fan after comparing the system temperature signal with the shutdown temperate signal if the system temperature as indicated by the system temperature signal is less than the shutdown temperature value as indicated by the shutdown temperature signal. The system temperature signal is compared with the shutdown temperature signal after entering the shutdown mode by the fan. Operation of the fan is initiated if the system temperature as indicated by the system temperature signal is greater than the shutdown temperature value as indicated by the shutdown temperature signal and the fan is in the shutdown mode.

In another embodiment, an apparatus for controlling the operation of a fan includes the fan, a fan controller and a thermal manager. The fan controller is coupled to control the speed of the fan. The thermal manager is coupled to provide an intelligent shutdown control signal to the fan controller. The fan controller includes a temperature sensing circuit, a pulse width modulator and a switch. The temperature sensing circuit is coupled to provide a temperature dependent electrical effect. The pulse width modulator coupled to receive the intelligent shutdown control signal and the temperature dependent electrical effect. The pulse width modulator generates an output signal having a first value when the intelligent shutdown control signal has a first value. The pulse width modulator generates the output signal having pulses of a second value when the intelligent shutdown control signal has a second value. The pulses having a width dependent on the temperature dependent electrical effect. The switch is coupled to receive the pulses. The switch applies power to the fan during each of the pulses of the output signal.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to be illustrative of the invention and should not be taken to be limiting. Rather, any number of variations may fall within the scope of the invention which is defined in the claims following the description.

Figure 1:
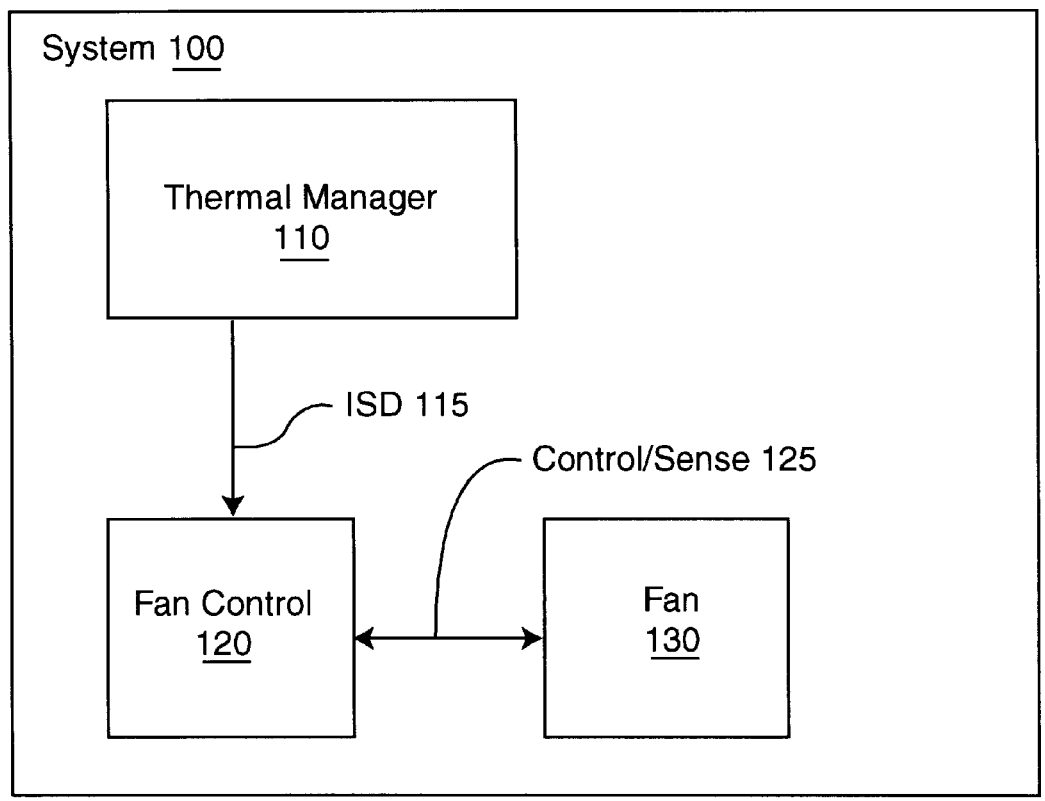
FIG. 1 shows a block diagram of system including a fan control method and/or circuit in accordance with the invention.

FIG. 1 shows a block diagram of a system including a fan control method and/or apparatus in accordance with the invention. System 100 includes thermal manager 110, fan controller 120 and fan 130. Thermal manager 110 is coupled to fan controller 120 via ISD coupling 115. Fan controller 120 is coupled to fan 130 via control/sense coupling 125. Thermal manager 110 enables an intelligent shutdown mode by asserting an intelligent shutdown mode control signal ISD on ISD coupling 115. Fan controller 120 controls the speed of fan 130 via control/sense coupling 125. Fan 130 is a brushless DC fan.

In operation, fan controller 120 of system 100 enables an intelligent fan shutdown mode responsive to a control input received from thermal manager 110. When the intelligent shutdown mode is enabled and the measured temperature is above a shutdown temperature value, fan controller 120 operates fan 130 at a temperature based speed. For example, a temperature based speed includes a speed that is generally proportional to temperature. When the intelligent shutdown mode is enabled and the measured temperature is below the shutdown temperate value, fan controller 120 automatically induces fan 130 to enter a shutdown state. When the measured temperature exceeds the shutdown temperature value and fan is in the shutdown state, fan controller 120 automatically induces fan 130 to exit the shutdown state and revert to an appropriate speed (e.g., a temperature based speed).

When the intelligent shutdown mode is not enabled and the measured temperature is above a minimum speed temperature value, fan controller 120 operates fan 130 at a temperature based speed such as a generally temperature proportional speed. When the intelligent shutdown mode is not enabled and the measured temperature is below the minimum speed temperature value, fan controller 120 reduces and maintains the speed of fan 130 at a minimum speed.

Figure 2:
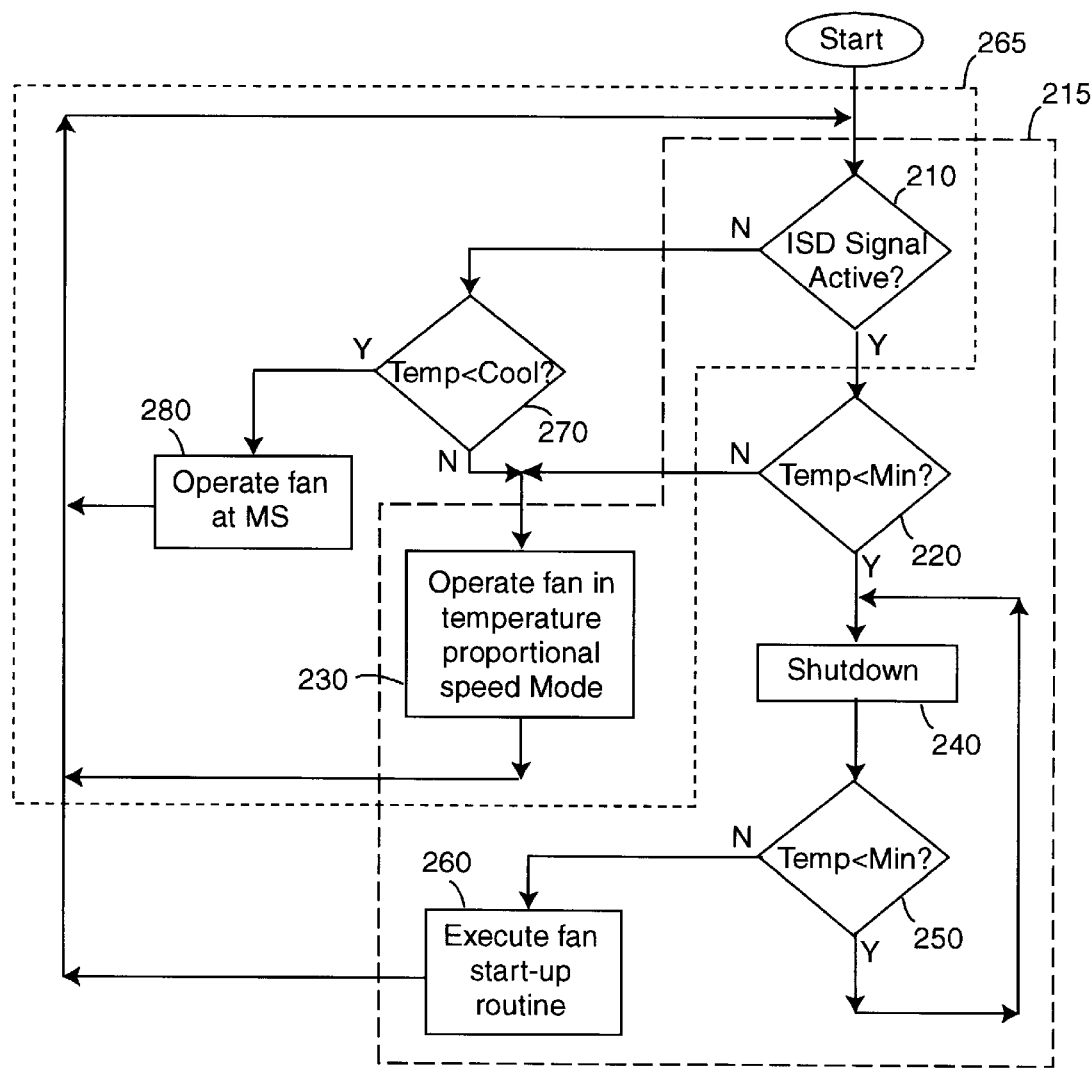
FIG. 2 shows a flowchart of fan power control in accordance with the invention.

FIG. 2 shows a flowchart of fan power control operation in accordance with the invention. During ISD enable decision 210, fan controller 120 determines if the intelligent shutdown control signal ISD is active. If the intelligent shutdown control signal is inactive, fan controller 120 operates fan 130 in a continuous operation mode 215 wherein fan 130 runs continuously and at a speed determined by the temperature of the system. If the intelligent shutdown control signal IDS is active, fan controller 120 operates fan 130 in an intelligent shutdown mode 265 wherein fan 130 is shutdown at certain temperatures and runs at certain temperatures.

Specifically, if signal ISD is inactive, control transitions from ISD enable decision 210 to minimum speed decision 270. During minimum speed decision 270, fan controller 120 determines if the measured temperature ("TEMP") of system 100 is less than a minimum speed temperature value ("COOL"). If the measured system temperature is less than the minimum speed temperature, control transitions to minimum speed operation 280 and fan controller 120 operates fan 130 at a minimum speed. If the measured system temperature is greater than the minimum speed temperature, control transitions to temperature proportional operation 230 and fan controller 120 operates fan 130 at a generally temperature proportional speed.

Thus, fan controller 120 operates fan 130 in continuous operation mode 265 if intelligent shutdown mode 215 is not enabled during ISD enable decision 210. In the embodiment of FIG. 2, the continuous operation mode 265 is initiated at ISD enable decision 210 and includes minimum speed decision 270, minimum speed operation 280 and temperature proportional operation 230. Fan 130 operates continuously but at different speeds while in the continuous operation mode 265. Fan 130 operates at the minimum speed when the measured system temperature is less than a particular minimum speed temperature value during operation 230. As the measured system temperature increases, the fan operates at correspondingly and proportionally higher speeds during operation 280.

If signal ISD is determined to be active during ISD enable decision 210, control transitions from ISD enable decision 210 to shutdown decision 220. During shutdown decision 220, fan controller 120 determines if the measured temperature ("TEMP") of system 100 is less than a shutdown temperature value ("MIN"). If the measured system temperature is greater than the shutdown temperature, control transitions to temperature proportional operation 230 and fan controller 120 operates fan 130 at a generally temperature proportional speed. If the measured system temperature is less than the shutdown temperature, control transitions to shutdown operation 240 and fan controller 120 initiates a shutdown of fan 130.

After fan 130 is shutdown during shutdown operation 240, control transitions to startup decision 250. During startup decision 250, fan controller 120 determines if the measured temperature ("TEMP") of system 100 is less than the shutdown temperature value ("MIN"). If the measured system temperature is less than the shutdown temperature, control transitions to shutdown operation 240 and fan controller 120 allows fan 130 to continue in a shutdown state. If the measured system temperature is greater than the shutdown temperature, control transitions to startup operation 260 and fan controller 120 executes a fan startup routine to initiate rotation of fan 130.

Thus, the intelligent shutdown mode 215 is activated when thermal manager 110 of system 100 asserts intelligent shutdown control signal ISD. In the embodiment of FIG. 2, intelligent shutdown mode 215 is initiated at ISD enable decision 210 and includes shutdown decision 220, temperature proportional operation 230, shutdown operation 240, startup decision 250 and startup operation 260. For measured system temperature values less than a shutdown temperature value MIN, fan controller 120 automatically induces fan 130 to enter a shutdown state during shutdown operation 240. Fan 130 is maintained in the shutdown state as long as the measured system temperature is determined to be lower than the shutdown temperature value MIN during startup decision 250. If the measured system temperature value rises above the shutdown temperature value MIN during startup decision 250, fan 130 is required to cool system 100, and fan controller 120 executes a fan 130 startup routine during startup operation 260.

Figure 5:
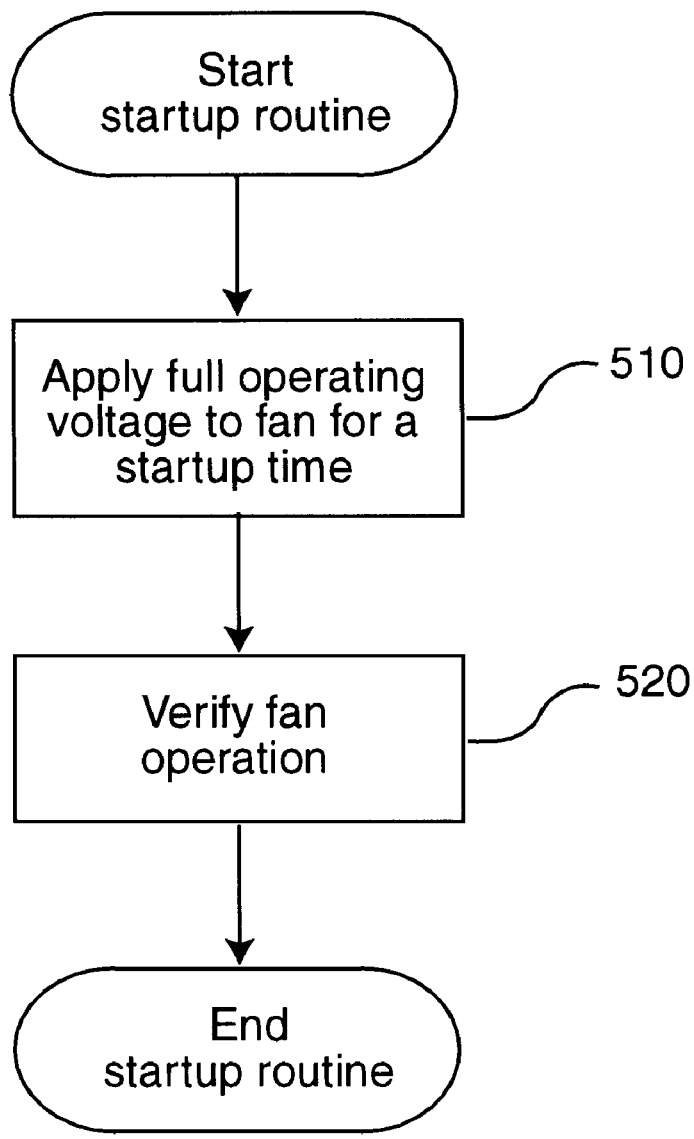
FIG. 5 shows a flowchart of a fan startup routine in accordance with the invention.

Referring to FIG. 5, the startup routine applies a full operating voltage to the fan for a time period sufficient to ensure startup during startup power operation 510. Control then transitions to verification operation 520. During verification operation 520, the startup routine electrically verifies that the fan is rotating. Once the startup routine is completed, fan 130 operates as specified above. Fan 130 is shutdown again if intelligent shutdown mode 215 is reentered (e.g., via assertion of ISD) and if the measured temperature is less than the shutdown temperature value MIN.

Figure 3A:
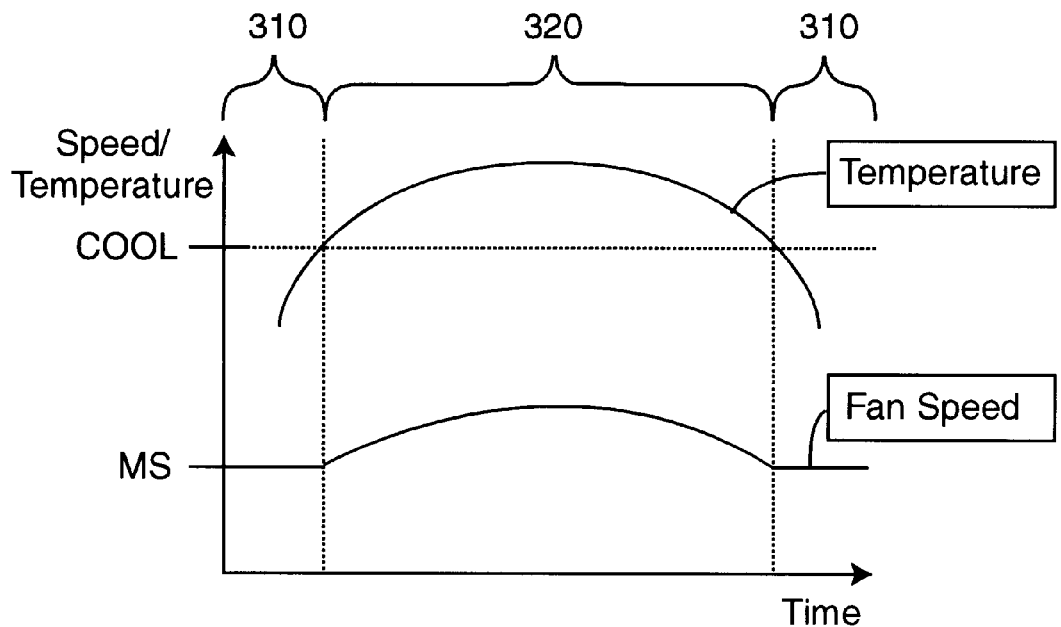
FIG. 3A shows a graph of fan speed control during continuous mode operation in accordance with the invention.

Referring to FIG. 3A, when intelligent shutdown mode 215 is disabled, fan controller 120 operates fan 130 according to a continuous operation mode 265. Specifically, when the temperature is below the minimum speed temperature value COOL during time 310, fan 130 operates at a constant minimum speed MS. When the temperature is above the minimum speed temperature value COOL during time 320, fan 130 operates at a speed that is generally proportional to the temperature.

Figure 3B:
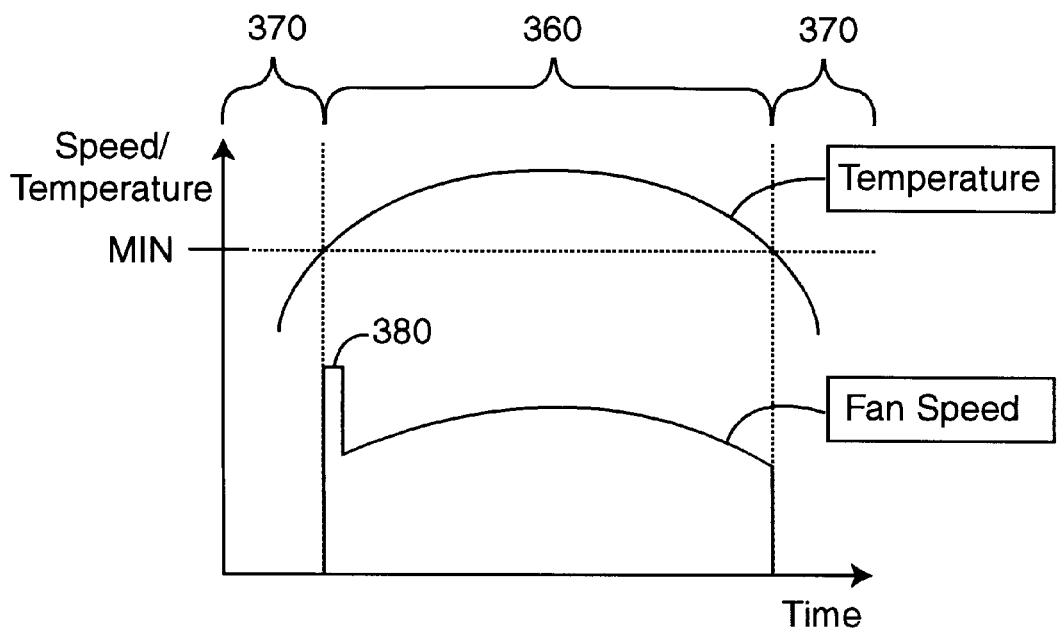
FIG. 3B shows a graph of fan speed control during intelligent shutdown mode operation in accordance with the invention.

Referring to FIG. 3B, when intelligent shutdown mode 215 is enabled, fan controller 120 operates fan 130 according to an intelligent shutdown mode 215. Specifically, when the temperature is below the shutdown temperature value MIN (e.g., when the temperature signal VIN is below the shutdown temperature threshold $V_{MIN}$) during time 370, fan controller 120 induces fan 130 to enter a shutdown state in which the speed of the fan decreases to zero revolutions per minute. When the a temperature is above the shutdown temperature value MIN (e.g., when the temperature signal VIN is above the shutdown temperature threshold $V_{MIN}$) during time 320, fan 130 operates at a speed that is generally proportional to the temperature. A fan startup routine is executed during the transition from time 370 to time 360 during which there may be some delay until the fan increases its speed first towards a maximum speed indicated at 380 and then to the generally proportional speed.

Figure 4:
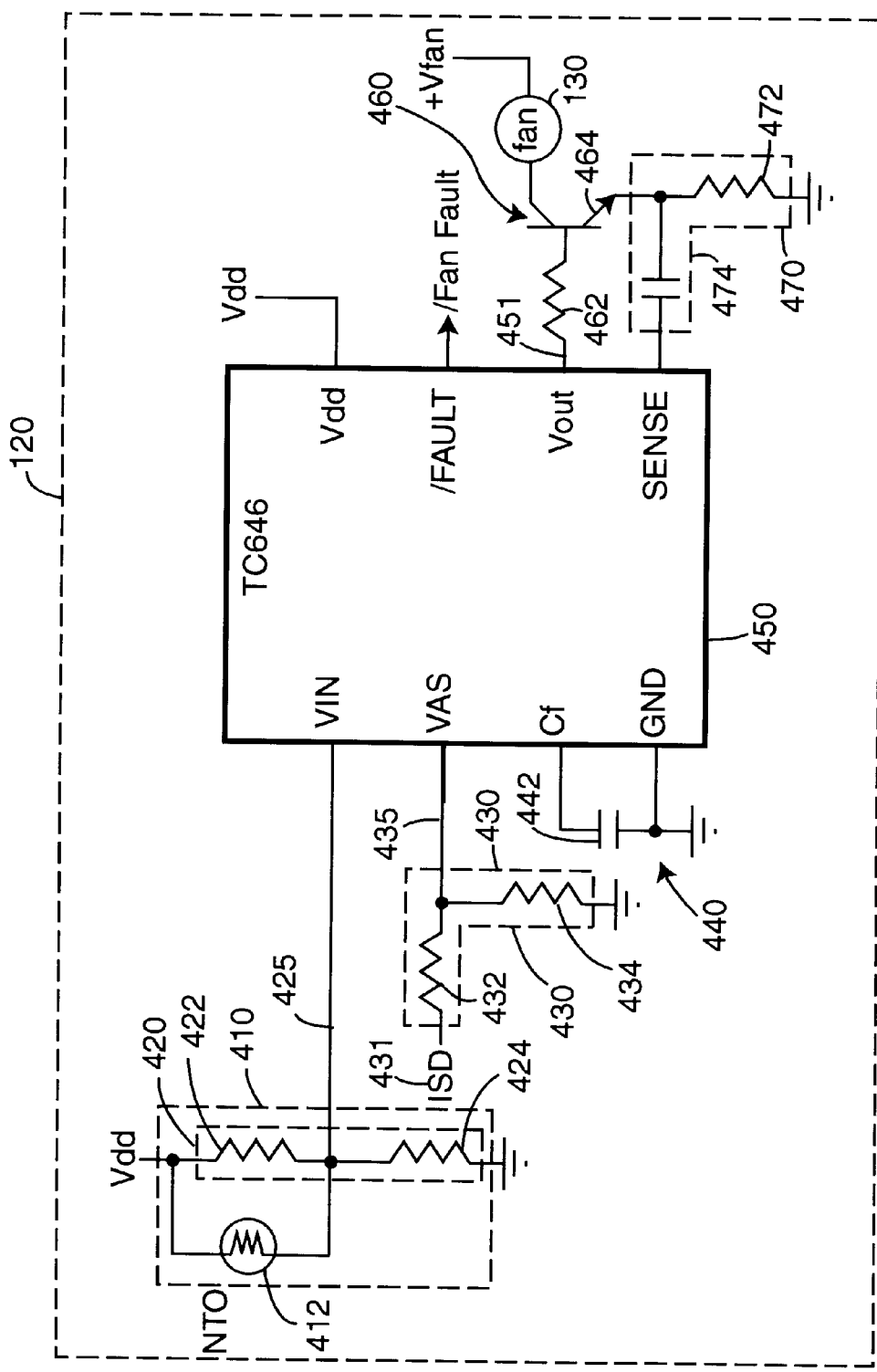
FIG. 4 shows a circuit diagram of a fan power controller in accordance with the invention.

FIG. 4 shows a circuit diagram including fan controller 120 coupled to fan 130 in accordance with the invention. Fan controller 120 includes temperature sensing circuit 410, ISD voltage divider 430, frequency selector circuit 440, integrated circuit 450, switch 460 and sense circuit 470. Temperature sensing circuit includes a temperature sensor such as NTC thermistor 412 and includes a minimum speed voltage divider 420. Minimum speed voltage divider 420 includes resistances 422, 424. ISD voltage divider 430 includes resistances 432, 434. Frequency selector circuit 440 includes capacitance 442. Integrated circuit 450 is a pulse-width modulated (PWM) thermal fan speed control integrated circuit. Switch circuit 460 includes base resistor 462 and NPN bipolar transistor 464. Sense circuit 470 includes sense resistance 472 and sense capacitance 474.

Thermistor 412 and minimum speed voltage divider 420 provide a generally temperature proportional input voltage VIN to integrated circuit 450. Minimum speed voltage divider 420 limits the input voltage VIN to a minimum speed value at low temperatures. Integrated circuit 450 receives the generally temperature proportional input voltage VIN and generates a pulse width modulated signal at VOUT. The frequency (e.g., 30 Hz) of VOUT is determined by capacitance 442 (e.g., 1 µF). The duty cycle of VOUT is determined by the generally temperature proportional value VIN. The pulses of VOUT turn on transistor 464 to apply an average power level to fan 130. ISD voltage divider 430 determines the shutdown value VAS below which fan 130 is automatically shut down during intelligent shutdown mode 215. Minimum speed voltage divider 420 determines the limiting value of VIN below which fan 130 operates at a constant, minimum speed. Sense resistance 472 and capacitance 474 provide a SENSE input signal to integrated circuit 450 for sensing interruptions in the fan ground return current due to commutation as each pole of fan 130 is energized. The SENSE signal allows verification that the fan is operating correctly. Fault detection capability may also be provided in accordance with the invention.

Thermistor 412 is a negative temperature coefficient (NTC) thermistor which exhibits a decreasing resistance value with increasing temperature. As the system temperature rises, the resistance of NTC thermistor 412 decreases. As the resistance of thermistor 412 decreases, the voltage over resistance 424 (e.g., the output of minimum speed voltage divider 420) increases so that the voltage on node VIN 425 increases. Thus, fan controller 120 measures the system temperature, and as the system temperature rises, the voltage on node VIN 425 rises. This in turn causes the pulse width of output signal VOUT 451 to increase in direct proportion to the increasing voltage on node VIN 425 if fan controller 120 is operating fan 130 at a generally temperature proportional speed. The increasing pulse width of output signal VOUT 451 causes switch 460 to apply a greater average supply voltage to fan 130 thereby increasing rotational fan speed proportional to measured system temperature. Similarly, fan speed is decreased with decreasing temperature.

The voltage on VAS 435 determines the shutdown temperature value MIN. The voltage on VAS 435 and, therefore, the shutdown temperature value MIN, are determined by the absolute voltage level of signal ISD and by the values of the resistances of ISD voltage divider 430 (e.g., resistance R3 432 and resistance R4 434). Intelligent shutdown control signal ISD 431 is a rail-to-rail voltage signal provided by thermal manager 110 over ISD coupling 115. When ISD is high, the shutdown voltage input VAS is equal to the voltage divided value $V_{MIN}$ of ISD. When ISD is low, VAS is also low. Intelligent shutdown mode 215 is activated when signal IDS is active (e.g., high). That is, when signal IDS is high, the shutdown temperature value MIN is represented by a voltage divided value $V_{MIN}$ of ISD when signal ISD is high. With ISD high, the intelligent shutdown mode 215 is enabled and shutdown is automatically entered when the voltage on VIN 425 is less than the voltage $V_{MIN}$ on VAS 435. Shutdown is exited when VIN 425 is greater than the voltage $V_{MIN}$ on VAS 435.

When ISD is low, $V_{MIN}$ is also low, thereby disabling intelligent shutdown mode 215 and enabling continuous operation mode 265. In continuous operation mode 265, the fan runs continuously and at a prescribed minimum speed when the measured system temperature is less than or equal to the minimum speed temperature COOL. The resistance of NTC thermistor 412 is very large relative to the values of resistances 422, 424 when the measured system temperature is less than or equal to the minimum speed temperature COOL. When the resistance of NTC thermistor 412 is large, the output of minimum speed voltage divider 420, and therefore, the minimum speed MS of fan 130, is substantially determined by the values of $V_{DD}$ and minimum speed resistances 422, 424.

In the embodiment of FIG. 4, integrated circuit 450 is a TelCom TC646 pulse-width modulated (PWM) thermal fan speed control integrated circuit manufactured by TelCom Semiconductor, Incorporated (referred to hereinafter as TelCom), of Mountainview, Calif. A data sheet for the TC646 is publicly available from TelCom and via the internet at TelCom's web site. The data sheet for the TC646 part which is available, for example, at internet uniform resource locator address http://www.telcom-semi.com/datashts/TC646.pdf on Apr. 20, 1998 is incorporated herein by reference.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, in one embodiment, system 100 includes a power supply system or other heat generating system. In one embodiment, system 100 includes an information processing system. Information processing systems include such systems as computer systems and telecommunications systems. Computer systems may be found in many forms including, for example, mainframes, workstations, servers, personal computers, notepads and embedded systems. A typical computer system includes at least one processing unit, associated memory and a number of input/output (I/O) devices. One of the distinguishing characteristics of personal computer systems is the use of a system board to electrically couple these components together. These components typically generate heat during normal operation.

Thermal manager represents any appropriate source of a temperature shutdown signal. In one embodiment, thermal manager 110 includes dedicated logic. In another embodiment, thermal manager 110 includes a processor microcontroller running a thermal management routine. In another embodiment, thermal manager 110 includes a circuit in which ISD 115 is hardwired to a power rail such as $V_{DD}$ such that intelligent shutdown mode is always enabled. In such an embodiment, no continuous mode operation is included in system 100. In another embodiment, thermal manager 110 exists outside system 100.

In one embodiment, fan controller 120 includes a fan control circuit. In another embodiment, fan controller 120 includes a software module executing on a processor or microcontroller. In one embodiment, the startup routine of FIG. 5 is implemented by fan controller 120. In one embodiment, the startup routine is performed by dedicated logic in a fan controller circuit. In another embodiment, the startup routine includes a software module of fan controller 120 executing on a processor or microcontroller.

In the embodiment of FIG. 4, the above described operations are implemented using a monolithic integrated circuit such as the TelCom TC646. In another embodiment, the above described operations are implemented using another integrated circuit. In another embodiment, the above described operations are implemented using discrete hardware such as analog comparators, operational amplifiers, and/or discrete logic devices such as gates. In another embodiment, the above described operations are implemented using software code of a microcontroller or microprocessor. In another embodiment, the above described operations are implemented using a combination of some or all of the above listed implementation elements.

Although an NTC thermistor 412 is used in the above described embodiment, any type of temperature sensor may be used. In the embodiment of FIG. 4, any type of voltage output temperature sensor may be coupled to TC646 type integrated circuit 450. Furthermore, hysteresis may be implemented in registering the transitions of the measured system temperature across the shutdown temperature value and the minimum speed temperature value. The shutdown temperature value and the minimum speed temperature value may be any appropriate value and may be the same value.

Although a bipolar transistor is used in switch 460, other transistors or switching circuits may be used in place of or in addition to the transistor shown in FIG. 4. For example, a Darlington transistor pair or a field effect transistor may be used. Furthermore, each of the transistors used in the above described embodiments (whether bipolar, field effect, etc.) may be conceptualized as having a control terminal which controls the flow of current between a first current handling terminal and a second current handling terminal. An appropriate condition on the control terminal causes a current to flow from/to the first current handling terminal and to/from the second current handling terminal. For example, whereas a control voltage may be described as being applied to a field effect transistor gate terminal in one embodiment, other embodiments may be more generally described as having a control signal applied to a transistor control terminal. In a bipolar NPN transistor, for example, the first current handling terminal is the collector, the control terminal is the base, and the second current handling terminal is the emitter. A sufficient current into the base causes a collector-to-emitter current to flow. In a bipolar PNP transistor, the first current handling terminal is the emitter, the control terminal is the base, and the second current handling terminal is the collector. A current flowing between the base and emitter causes an emitter-to-collector current to flow. Similar principles apply to other types of transistors and are well known in the art.

Regarding the signals described herein, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the above described embodiment are characterized as being transmitted from one block to the next, other embodiments of the invention may include modified signals in place of such directly transmitted signals as long as the informational and/or functional aspect of the signal is transmitted between blocks. To some extent, due to physical limitations of the circuitry involved, a signal input at a second logic block may be conceptualized as a second signal derived from a first signal which is output from a first logic block (e.g., there will inevitably be some attenuation and delay). Therefore, as used herein, a signal transmitted between logic blocks may include a second signal derived from a first signal, whether due to circuit limitations or due to passage through other circuit elements which do not change the informational and/or final functional aspect of the first signal.

Those skilled in the art will recognize that circuit elements in circuit diagrams and boundaries between logic blocks are merely illustrative and that alternative embodiments may merge logic blocks or circuit elements or impose an alternate decomposition of functionality upon various logic blocks or circuit elements. Similarly, the operations of the above description are for illustration only. Operations may be combined or the functionality of the operations may be distributed in additional operations in accordance with the invention. In one embodiment, the operations are implemented via software modules. Other embodiments use non-software based control methods such as application specific integrated circuits.

Moreover, alternative embodiments may combine multiple instances of a particular component. For example, multiple fans 130 may be controlled by a fan controller 120. Also, a system may include multiple fan controllers 120 and/or thermal managers 120. Also, a system may include multiple temperature sensor circuits.

As used herein, generally proportional includes precisely proportional and variation therefrom. For example, depending on non-ideal circuit and/or system effects, etc., generally proportional will inevitably include deviations from a precisely proportional function. Generally proportional may preferably include monotonicity so that a generally temperature proportional speed is provided by a fan speed function demonstrating an increased speed for increases in system temperature (e.g., the derivative of speed with respect to temperature is never negative). However, monotonicity may not be appropriate or required for all applications. Generally proportional may include monotonicity, but does not necessarily include monotonicity. Variations in fan speed may be permissible and still be generally proportional so that fan speed is generally slower at lower temperatures and generally higher at higher temperatures.

Although an attempt has been made to outline a few exemplary variations, other examples of the invention are within the scope of invention as defined in the claims below.

What is claimed is:

1. A method for controlling the operation of a brushless DC fan for cooling heat generating components of a system when system temperature of said system exceeds a prescribed limit, the method comprising:

sensing temperature of said system and generating a system temperature signal indicative of the system temperature;

generating an intelligent shutdown enable signal to shut down the fan when system temperature is less than said prescribed limit;

comparing the system temperature signal with the shutdown enable signal;

operating the fan at a speed generally proportional to said system temperature after comparing the system temperature signal with the shutdown enable signal if the system temperature as indicated by the system temperature signal is greater than the shutdown temperature value as indicated by the shutdown enable signal;

entering a shutdown mode by the fan after comparing the system temperature signal with the shutdown enable signal if the system temperature as indicated by the system temperature signal is less than the shutdown temperature value as indicated by the shutdown enable signal;

comparing the system temperature signal with the shutdown enable signal after entering the shutdown mode by the fan; and initiating operation of the fan if the system temperature as indicated by the system temperature signal is greater than the shutdown enable signal value.

2. A method, as recited in claim 1, further comprising:

generating an intelligent minimum speed enable signal to operate the fan at a minimum speed;

comparing the system temperature signal with the intelligent minimum speed enable signal;

operating the fan at a generally temperature proportional speed after comparing the system temperature signal with the minimum speed enable signal if the system temperature as indicated by the system temperature signal is greater than the minimum speed temperature value as indicated by the minimum speed enable signal;

operating the fan at a minimum speed after comparing the system temperature signal with the minimum speed enable signal if the system temperature as indicated by the system temperature signal is less than the minimum speed temperature value as indicated by the minimum speed enable signal.

3. A method, as recited in claim 1, wherein the intelligent shutdown enable signal is provided by hardwiring the intelligent shutdown enable signal to a first value.

4. A method, as recited in claim 1, further comprising the step of:

initiating operation of the fan by applying a start-up voltage to the fan for a start-up time; and then verifying that the fan is rotating.

5. An apparatus for controlling the operation of a brushless DC fan for cooling heat generating components of a system, the apparatus comprising:

the fan;

a fan controller coupled to control the speed of the fan;

a thermal manager coupled to provide an intelligent shutdown control signal to the fan controller; wherein the fan controller includes a temperature sensing circuit coupled to provide a temperature dependent electrical effect;

a pulse width modulator coupled to receive the intelligent shutdown control signal, the pulse width modulator generating an output signal having a first value when the intelligent shutdown control signal has a second value; and the temperature dependent electrical effect, the pulse width modulator being operable to generate the output signal having pulses of a third value when the intelligent shutdown control signal has a fourth value, the pulses having a width dependent on the temperature dependent electrical effect; and a switch coupled to receive the pulses, the switch applying power to the fan during each of the pulses of the output signal.

6. An apparatus, as recited in claim 5, wherein the first value is a logic low and the third value is a logic high.

7. An apparatus, as recited in claim 6, wherein the second value is a logic low and the fourth value is a logic high.

8. An apparatus, as recited in claim 5, wherein the temperature dependent electrical effect is a generally temperature proportional voltage value.

9. An apparatus, as recited in claim 8, wherein the temperature dependent electrical effect is monotonic with respect to temperature.

10. An apparatus, as recited in claim 8, wherein the temperature sensing circuit comprises:

a thermistor having a temperature dependent coefficient of resistance.

11. An apparatus, as recited in claim 10, wherein the temperature sensing circuit further comprises:

a minimum speed voltage divider including a first resistance coupled in parallel with the thermistor, the thermistor having a negative temperature dependent coefficient of resistance; and a second resistance coupled in series with the first resistance.

12. An apparatus, as recited in claim 10, wherein a ratio of the first resistance to the second resistance determines a minimum voltage output from the voltage divider, the minimum voltage output setting a minimum speed for the fan during fan operation.

13. An apparatus, as recited in claim 5, wherein the fan controller further comprises:

an intelligent shutdown voltage divider coupled to receive the intelligent shutdown control signal at a voltage divider input and coupled to provide a shutdown voltage at a voltage divider output terminal, the shutdown voltage being representative of a shutdown temperature below which the pulse width modulator generates the output signal having the first value.

14. An apparatus, as recited in claim 13, wherein
the shutdown voltage has a ground value when the intelligent shutdown control signal has the second value; and
the shutdown voltage has a non-ground value when the intelligent shutdown control signal has the fourth value.

15. An apparatus, as recited in claim 5, wherein the switch includes a transistor comprising:
a first current handling terminal coupled to the fan;
a second current handling terminal coupled to a power rail; and
a control terminal coupled to receive a control signal from the pulse width modulator.

16. An apparatus, as recited in claim 5, further comprising:
a sense circuit for verifying that the fan is operating.

17. An apparatus, as recited in claim 5, further comprising an TC646 integrated circuit, the TC646 integrated circuit including the pulse width modulator.

18. An apparatus, as recited in claim 5, wherein the thermal manager comprises a wire coupling the intelligent shutdown control signal to a power rail so that the intelligent shutdown control signal always has the fourth value.

19. An apparatus, as recited in claim 5, wherein the thermal manager comprises a microprocessor running a thermal management routine for driving the intelligent shutdown control signal to the second value to disable an intelligent shutdown mode and for driving the intelligent shutdown control signal to the fourth value to enable the intelligent shutdown mode.

20. An apparatus, as recited in claim 5, wherein the fan controller further comprises:
an intelligent shutdown voltage divider coupled to receive the intelligent shutdown control signal at a voltage divider input and coupled to provide a shutdown voltage at a voltage divider output terminal, the shutdown voltage being representative of a shutdown temperature below which the pulse width modulator generates the output signal having the first value, the shutdown voltage having a logic low value when the intelligent shutdown control signal has the second value and a logic high value when the intelligent shutdown control signal has the fourth value.

21. An apparatus, as recited in claim 20, wherein
the temperature sensing circuit includes
a thermistor having a temperature dependent coefficient of resistance, the temperature dependent electrical effect being a generally temperature proportional voltage value;
a minimum speed voltage divider including a first resistance coupled in parallel with the thermistor and a second resistance coupled in series with the first resistance, a ratio of the first resistance to the second resistance determining a minimum voltage output from the voltage divider, the minimum voltage output setting a minimum speed for the fan during fan operation.

22. An apparatus, as recited in claim 21, wherein the switch includes a transistor comprising:
a first current handling terminal coupled to the fan;
a second current handling terminal coupled to a power rail; and
a control terminal coupled to receive a control signal from the pulse width modulator.

23. An apparatus, as recited in claim 5, wherein the system is an information processing system.

24. An apparatus, as recited in claim 5, wherein the system is a power supply system.

25. An apparatus for controlling the operation of a brushless DC fan for cooling heat generating components of a system, the apparatus comprising:
means for providing a system temperature signal indicative of a system temperature;
means for providing an intelligent shutdown enable signal;
means for comparing the system temperature signal with a shutdown temperature signal if the intelligent shutdown enable signal has a first value, the shutdown temperature signal being representative of a shutdown temperature value;
means for operating the fan at a generally temperature proportional speed after comparing the system temperature signal with the shutdown temperature signal if the system temperature signal has a first relation to the shutdown temperature signal;
means for entering a shutdown mode by the fan after comparing the system temperature signal with the shutdown temperature signal if the system temperature signal has a second relation to the shutdown temperature signal;
means for comparing the system temperature signal with the shutdown temperature signal after entering the shutdown mode by the fan; and
means for initiating operation of the fan if the system temperature signal has the first relation to the shutdown temperature and the fan is in the shutdown mode.

26. An apparatus, as recited in claim 25, further comprising:
means for comparing the system temperature signal with a minimum speed temperature signal if the intelligent shutdown enable signal has a second value;
means for operating the fan at a generally temperature proportional speed after comparing the system temperature signal with the minimum speed temperature signal if the system temperature signal has a third relation to the minimum speed temperature signal;
means for operating the fan at a minimum speed after comparing the system temperature signal with the minimum speed temperature signal if the system temperature signal has a fourth relation to the minimum speed temperature signal.

27. An apparatus, as recited in claim 26, wherein
the first relation is a relation representative of the system temperature being greater than the shutdown temperature value;
the second relation is a relation representative of the system temperature being less than the shutdown temperature value;
the third relation is a relation representative of the system temperature being greater than the minimum speed temperature value; and
the fourth relation is a relation representative of the system temperature being less than the minimum speed temperature value.

28. An apparatus, as recited in claim 25, wherein
the first relation is a relation representative of the system temperature being greater than the shutdown temperature value;
the second relation is a relation representative of the system temperature being less than the shutdown temperature value.

29. An apparatus, as recited in claim 25, further comprising:

means for providing the shutdown temperature signal.

30. An apparatus, as recited in claim 25, wherein the means for initiating operation of the fan comprises:

means for applying a start-up voltage to the fan for a start-up time; and means for verifying that the fan is rotating.

* * * * *

UNITED STATES PATENT AND TRADEMARK OFFICE
CERTIFICATE OF CORRECTION

PATENT NO. : 6,037,732
DATED : March 14, 2000
INVENTOR(S) : Donald E. Alfano, et al.

It is certified that error appears in the above-indentified patent and that said Letters Patent is hereby corrected as shown below:

Column 10, line 57, delete "10" and substitute therefor --11--.

Signed and Sealed this

Twenty-seventh Day of March, 2001

*Attest:*

NICHOLAS P. GODICI

*Attesting Officer*

*Acting Director of the United States Patent and Trademark Office*